United States Patent
Albers

(10) Patent No.: US 7,508,690 B2
(45) Date of Patent: Mar. 24, 2009

(54) MONITORING AND CONTROL DEVICE AND BRIDGE MODULE THEREFOR

(75) Inventor: Thomas Albers, Minden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 348 days.

(21) Appl. No.: 11/424,595

(22) Filed: Jun. 16, 2006

(65) Prior Publication Data

US 2006/0284596 A1   Dec. 21, 2006

(30) Foreign Application Priority Data

Jun. 20, 2005  (DE) .................. 10 2005 028 735

(51) Int. Cl.
*H02M 1/00* (2007.01)
(52) U.S. Cl. ..................................... 363/144
(58) Field of Classification Search ............ 363/98, 363/132, 144; 307/113, 125, 126, 150; 361/59, 361/60, 68, 601, 611, 622, 624, 627, 631, 361/637, 728, 729, 733
See application file for complete search history.

(56) References Cited

U.S. PATENT DOCUMENTS

| | | | | |
|---|---|---|---|---|
| 5,726,506 | A * | 3/1998 | Wood | 307/147 |
| 6,317,012 | B1 * | 11/2001 | Coffey | 333/24 R |
| 6,489,693 | B1 * | 12/2002 | Hetzler | 307/10.1 |
| 6,856,045 | B1 * | 2/2005 | Beneditz et al. | 307/43 |

FOREIGN PATENT DOCUMENTS

| DE | 4402002 A1 | 7/1995 |
|---|---|---|
| EP | 1 089 190 A2 | 4/2001 |
| EP | 1 021 939 | 4/2004 |

OTHER PUBLICATIONS

Detie Tschimpke "Flexibilitat sahlt sich aus", electroAUTOMATION, 4/200, pp. 2-3, Apr. 2005.

* cited by examiner

*Primary Examiner*—Matthew V Nguyen
(74) *Attorney, Agent, or Firm*—Whitham Curtis Christofferson & Cook, PC

(57) ABSTRACT

Disclosed is a monitoring and/or control device (1) having an assembly of system modules ($S_i$) in the form of field bus coupler modules, supply modules and/or input/output modules, which are arranged adjacent to one another and have terminal contacts in order to connect a system bus (4) and/or a voltage supply terminal of a system module ($S_i$) to the subsequent system module ($S_{i+1}$). At the end of the assembly of system modules ($S_i$), a bridge module (B) is provided opposite a field bus coupler ($S_1$) for coupling the system bus (4) to a field bus (7) and/or opposite a voltage supply module ($S_2$) for feeding a supply voltage for the connected system modules ($S_i$) for the redundant voltage supply of the system modules ($S_i$) adjoining the bridge module (B) and/or for providing the system bus (4) for the system modules ($S_i$) adjoining the bridge module (B) if a system module ($S_i$) is removed from the sequence of system modules ($S_i$).

10 Claims, 2 Drawing Sheets

MONITORING AND CONTROL DEVICE AND BRIDGE MODULE THEREFOR

BACKGROUND OF THE INVENTION

1. Field of the Invention

The invention relates to a monitoring and/or control device having an assembly of system modules in the form of field bus coupler modules, supply modules and/or input/output modules, which are arranged adjacent to one another and have terminal contacts in order to connect a system bus and/or a voltage supply terminal of a system module to the subsequent system module.

2. Description of the Related Art

Such monitoring and/or control devices are known, for example, for programmable logic controllers (PLCs) or process monitoring systems and are described in DE 44 02 002 A1. System modules which each have a dedicated housing having electrical connection terminals which are accessible from the outside are plugged onto a common top-hat rail. The system modules are arranged adjacent to one another on the top-hat rail, associated electrical contact terminals of mutually adjoining system modules being connected to one another. In this manner, voltage supply lines are realized, via which voltage is supplied to the connected system modules starting from a regulated switched mode power supply (voltage supply module) which is generally arranged on the left-hand side on the top-hat rail. In a corresponding manner, a system bus is realized by the electrical contact terminals which is fed via a field bus coupling module from the left-hand side. The field bus coupling module is used for coupling the internal system bus to an external field bus.

The advantage of this first design is that the line length of the supply lines and the system bus is determined by the system modules themselves, and no separate lines are required.

A second design, which is described, for example, in D. Tschimpke: "Flexibilität zahlt sich aus", [flexibility pays off] in elektro AUTOMATION [electro automation], April 2005, pp. 2+3, envisages that the system bus and/or the voltage supply lines are implemented on the top-hat rail. The system modules have contact pins for making contact with the system bus lines and voltage supply lines. However, this has the disadvantage that the top-hat rails are relatively complex, and the line lengths are not matched optimally to the actually required line lengths. This may result in unnecessary attenuation losses. In addition, the system bus lines and voltage supply lines are accessible from the outside and are subject to a potential risk of interference.

In the implementation of the system bus and/or the voltage supply line using the first design with connection terminals at the system modules for the further connection of the system bus or the voltage supply line to an adjacent system module, there is the problem that the system bus and the voltage supply line is interrupted by a system module in a sequence of system modules being removed.

Hot-swappable systems are required for automating processes in which the replacement of individual electronic components should not result in the entire system coming to a standstill. The reason for the replacement may be a defect in an individual electronic component or the need for a modification.

SUMMARY OF THE INVENTION

One object of the invention is therefore to provide an improved monitoring and/or control device, whose functionality is ensured even when a system module is removed from a sequence of system modules.

The object is achieved according to the invention using the monitoring/control device of the type mentioned initially by the fact that, at the end of the assembly of system modules, at least one bridge module is provided opposite a field bus coupler for coupling the system bus to a field bus and/or opposite a voltage supply module for feeding the supply voltage for the connected system modules for the redundant voltage supply of the system modules adjoining the bridge module and/or for providing the system bus for the system modules adjoining the bridge module if a system module is removed from the sequence of system modules.

The monitoring/control device, as regards the implementation of the system bus and the voltage supply line, may be a combination of the first and the second design. The monitoring/control device is preferably implemented completely using the first design, however.

In the case of an arrangement of system modules on a top-hat rail which are generally supplied with a supply voltage from the left-hand side by a voltage supply module and have a common system bus made available to them with the aid of a field bus coupling module, a hot-swappable bridge module is used in place of the conventional connection terminal with terminating resistors for the system bus, said hot-swappable bridge module supplying the system modules connected thereto with the supply voltage and/or the system bus from the right-hand side if the sequence is interrupted by a system module being removed.

The bridge module preferably has a monitoring unit for detecting the interruption of the system bus and/or for detecting disconnection of the supply voltage if a system module is removed from the sequence of system modules. The system bus and/or the voltage supply is then provided for the sequence of system modules adjoining the bridge module with as little delay as possible with the aid of the monitoring unit. This means that the voltage supply and the system bus are not provided permanently by the bridge module, but only when required. The regulation of a regulated switched mode power supply of a voltage supply module is therefore prevented from being disrupted, and correct termination of the system bus is ensured. In order to provide a redundant system bus, the bridge module preferably has a terminating resistor, which is connected in the correct state. Only if an interruption of the system bus has been detected is the terminating resistor replaced by the system bus, which is connected to the bridge module via a floating line.

In one preferred embodiment, the bridge module has a regulated switched mode power supply having connection terminals which are accessible from the outside and are intended to be wired to a voltage supply terminal of another system module of the monitoring/control device. The bridge module is supplied with a supply voltage of, for example, 24 V, which is generally available in a switchgear cabinet, using a floating line. Using the regulated switched mode power supply, this voltage is adjusted down to an internal supply voltage of, for example, 5 V or 3.3 volts.

In another preferred embodiment, the bridge module does not have a switched mode power supply. Instead, connection terminals, which are accessible from the outside, are provided for a voltage supply line to an output of a regulated switched mode power supply of a system module. The connection terminals are connected directly to the voltage supply terminal for the system modules adjoining the bridge module. In this case, it is possible to dispense with a monitoring unit, and the voltage supply can be fed in with permanent redundancy via the bridge module since a conflict in terms of regulation between switched mode power supplies is avoided.

It is likewise advantageous if a bridge module has connection terminals, which are accessible from the outside, for a separate system bus line which can be connected to another system module of the monitoring/control device. In this case, the bridge module for providing a redundant voltage supply does not need to be identical to the bridge module for providing a redundant system bus. A dedicated bridge module can be provided for each purpose. However, it is advantageous to integrate the two functions in one bridge module. The connection terminals for the system bus are preferably provided for connection to connection terminals, which are accessible from the outside, of a field bus coupling module. The field bus coupling module is in this case modified such that connection terminals, which are accessible from the outside, are provided there for the system bus.

It is also advantageous if a bridge module has both connection terminals for the redundant system bus and connection terminals for a supply voltage. The system bus and the supply voltage are therefore provided by floating lines, which are plugged into the connection terminals of the bridge module. The monitoring unit can easily be designed such that a removal of a system module is detected using a dip in the supply voltage and, subsequently, countermeasures can be introduced immediately by connecting the redundant supply voltage to the terminal contacts of the bridge module and connecting the system bus to the corresponding terminal contacts of the bridge module.

THE BRIEF DESCRIPTION OF THE DRAWINGS

The invention will be explained in more detail below with reference to exemplary embodiments using the attached drawings.

DETAILED DESCRIPTION OF THE PREFFERED EMBODIMENT

Figure 1:
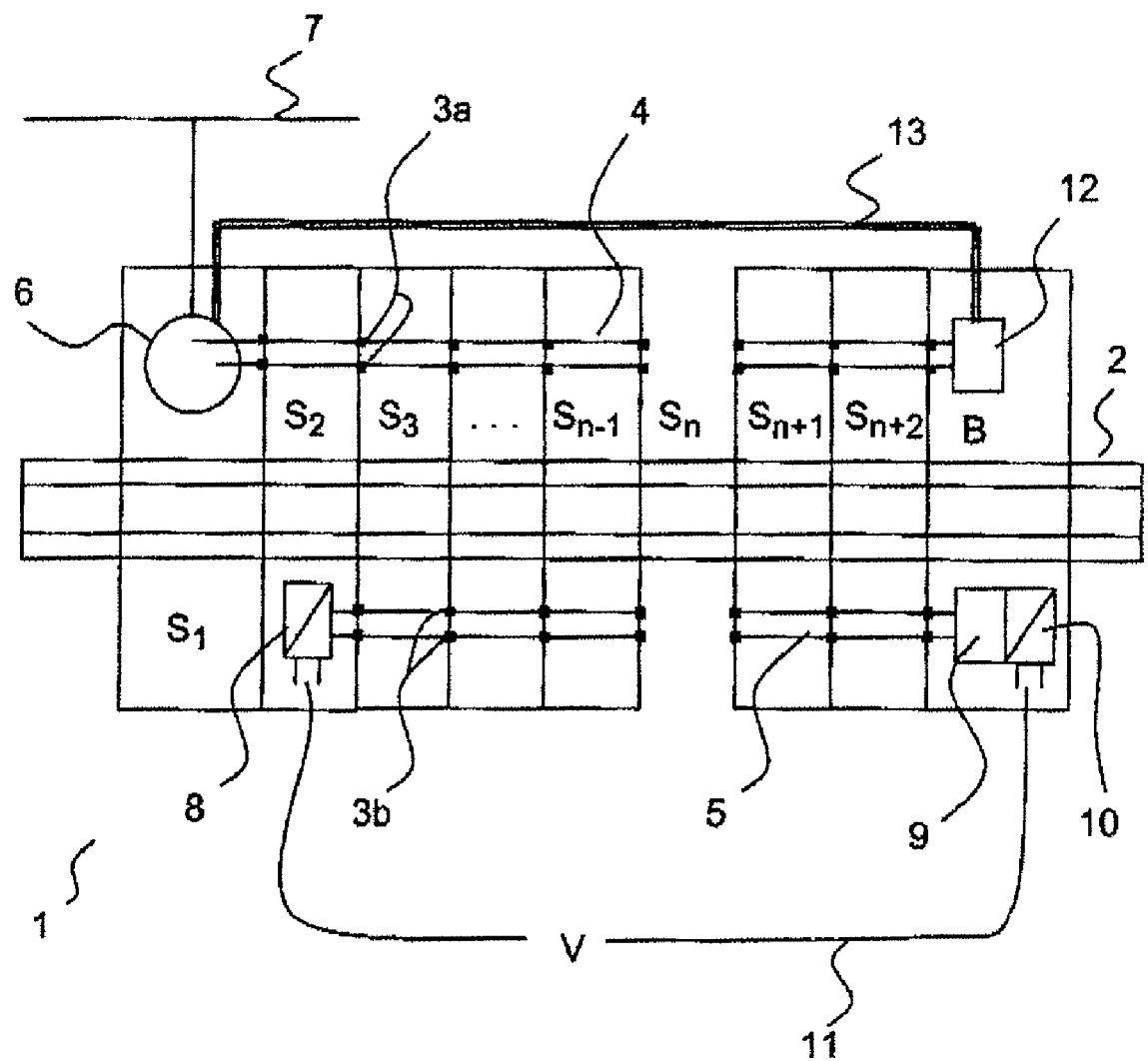
FIG. 1 shows a block diagram of a monitoring and/or control device having a bridge module at the right-hand end of the sequence of system modules.

FIG. 1 shows a block diagram of a monitoring and/or control device 1, in which an assembly of system modules $S_i$, where i=1 to N, is plugged onto a top-hat rail 2. The system modules $S_i$ are arranged adjacent to one another and have terminal contacts 3a for a system bus 4 and terminal contacts 3b for a voltage supply line 5. Depending on the design, it is also possible for only either the system bus 4 or the voltage supply line 5 to be realized with the aid of the terminal contacts 3a, 3b. In each case one terminal contact 3 on the left-hand side of a system module $S_i$ is connected to an associated terminal contact 3 on the right-hand side of the housing of the system module $S_i$. The terminal contacts 3 are designed such that, when a system module $S_i$ is plugged on, the terminal contact 3 is electrically connected to a corresponding terminal contact 3 of the adjacent system module $S_i$. In this manner, a system bus 4 or a voltage supply line 5 is formed in a simple manner by system modules $S_i$ being arranged next to one another in a row.

At the left-hand end of the system modules $S_i$, which have been plugged onto the top-hat rail 2, a field bus coupling module $S_1$ is arranged as the system module S. The system bus/field bus coupling module $S_1$ has a coupling unit 6 in order to couple the internal system bus 4 to an external field bus 7. Such field bus coupling modules $S_1$ are known to a sufficient extent.

A voltage supply module $S_2$ having a regulated switched mode power supply 8, which is connected to a supply voltage V of, for example, 24 V with the aid of connection terminals (not illustrated) on the housing of the voltage supply module $S_2$, is provided adjacent to the field bus coupling module $S_1$. The field bus coupling module $S_1$ and the voltage supply module $S_2$ can be realized separately from one another or as an integral unit. Starting from the voltage supply module $S_2$, the voltage supply line 5 is provided for the adjacent system modules $S_i$.

At the right-hand end, which is opposite the field bus coupling module $S_1$ and the voltage supply module $S_2$, of the sequence of system modules $S_i$, a bridge module B is provided which has a first monitoring unit 9 for detecting a dip in the supply voltage on the voltage supply line 5. Furthermore, a regulated switched mode power supply 10 is integrated in the bridge module B in order to provide a redundant voltage supply for the system modules $S_{n+i}$ adjoining the bridge module B on the left-hand side if a dip in the voltage supply has been detected. The regulated switched mode power supply 10 is permanently supplied with a supply voltage V of, for example, 24 V with the aid of floating lines 11 using connection terminals (not illustrated), which are accessible from the outside, on the housing of the bridge module B. The supply voltage V is generally available, without any problems, for example at connection terminals of a voltage supply module $S_2$ in conventional monitoring/control devices 1.

As an addition or as an alternative to the redundant voltage supply, a second monitoring unit 12 is provided which, in the event of a failure of the supply voltage being detected on the voltage supply line 5 and/or in the event of a failure of the system bus 4 being detected, supplies the system modules $S_{n+1}, S_{n+2} \ldots$ adjoining the bridge module B on the left-hand side with the system bus if, for example, the system module $S_n$ has been removed. For this purpose, the bridge module B is connected to corresponding connection terminals on the field bus coupling module $S_1$ using a floating line 13 via connection terminals, and the system bus is made available to these corresponding connection terminals. If possible, at least one terminating impedance may be provided in the bridge module B in order to ensure correct operation of the system bus 4.

Figure 2:
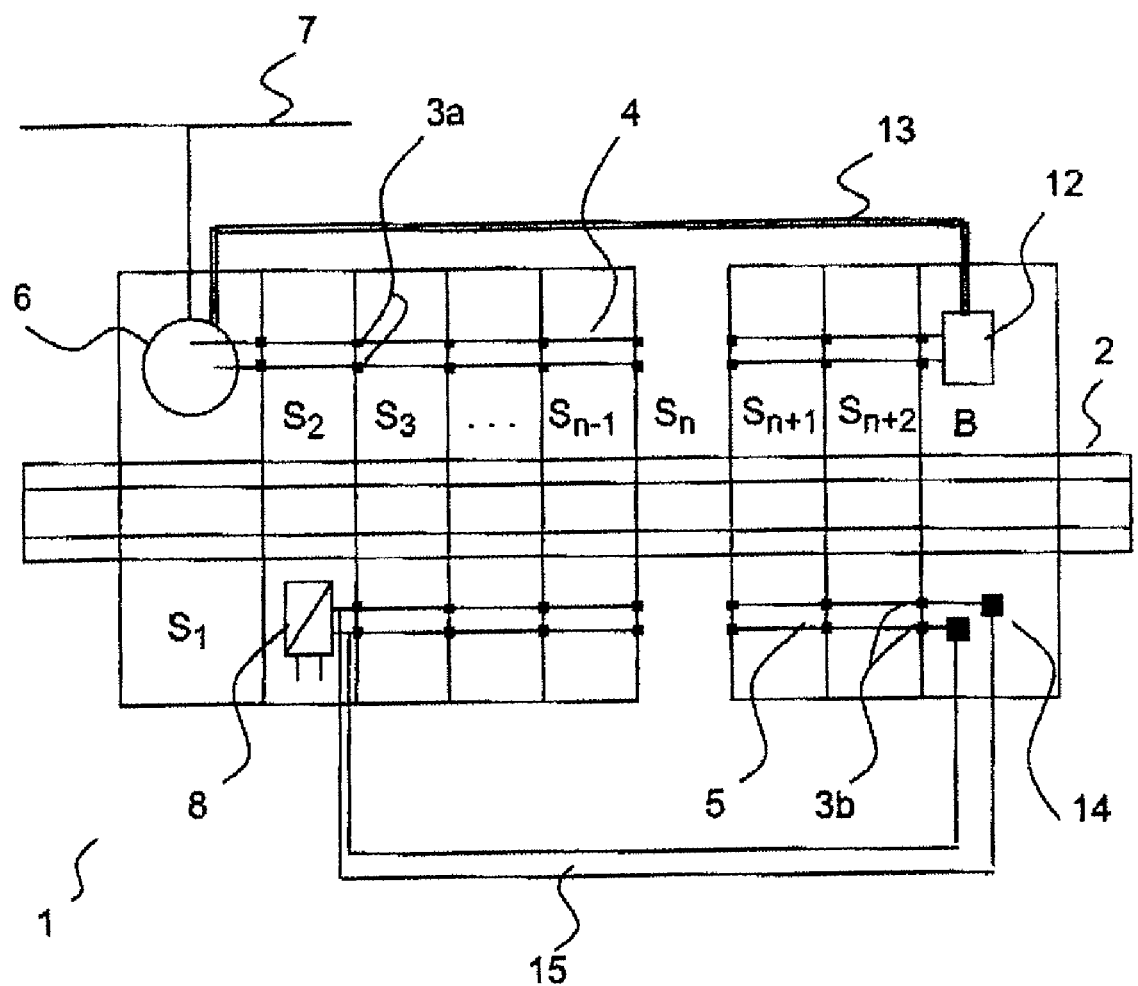
FIG. 2 shows a block diagram of a second embodiment of the monitoring and/or control device.

FIG. 2 shows a second embodiment of the monitoring/control device 1, in which the bridge module does not have a dedicated switched mode power supply or a monitoring unit 9 for ensuring a redundant voltage supply. Instead, connection terminals 14, which are accessible from the outside, are provided for the purpose of connecting a floating voltage supply line 15 to an output of a regulated switched mode power supply 8 of a system module $S_2$. The connection terminals 14 are connected directly to the voltage supply terminal 3b for the system modules $S_{n+1}, S_{n+2}, \ldots$ adjoining the bridge module B. In the second embodiment, the supply voltage for the system modules $S_i$ is fed in with permanent redundancy via the bridge module.

Further operation of the system modules $S_{n+1}, S_{n+2}, \ldots S_N$ adjoining the bridge module B on the left-hand side is therefore ensured with the aid of the bridge module B, even if a system module $S_n$ is removed from the sequence of system modules $S_i$. The system modules $S_3 \ldots S_{n-1}$ adjoining the removed system module $S_N$ on the left-hand side, on the other hand, are also supplied with the voltage supply line 5 and the system bus 4 from the left-hand side, as is the case during normal operation.

In this manner, the monitoring/control device 1 is made hot-swappable in a simple manner.

The invention claimed is:

1. Control device having an assembly of system modules ($S_i$) in the form of at least one of field bus coupler modules, supply modules and input/output modules, which are arranged adjacent to one another and have terminal contacts in order to connect at least one of a system bus and a voltage supply terminal of a system module ($S_i$) to the subsequent system module ($S_{i+1}$), characterized in that at least one bridge module (B) for the redundant voltage supply of the system modules ($S_i$) adjoining the bridge module (B) and for providing the system bus for the system modules ($S_i$) adjoining the bridge module (B) is provided at the end of the assembly of system modules ($S_i$), either opposite a field bus coupler ($S_1$) for coupling the system bus to a field bus or opposite a voltage supply module ($S_2$) for feeding a supply voltage for the connected system modules ($S_i$) if a system module ($S_i$) is removed from the sequence of system modules ($S_n$).

2. Control device according to claim 1, characterized in that the bridge module (B) has a monitoring unit for monitoring the supply voltage and detecting the removal of a system module ($S_i$) from the sequence of system modules ($S_i$) in the event of a dip in the supply voltage.

3. Control device according to claim 1, characterized in that at least one of a system module ($S_i$) the bridge module (B) have a monitoring unit for detecting the interruption of the system bus when a system module ($S_i$) is removed from the sequence of system modules ($S_i$) and for subsequently providing the system bus for the sequence of system modules ($S_i$) adjoining the bridge module (B).

4. Control device according to claim 1, characterized in that the bridge module (B) has a regulated switched mode power supply having connection terminals which are accessible from the outside and are intended to be wired to a voltage supply terminal of another system module ($S_i$) of the monitoring and control system.

5. Control device according to claim 1, characterized in that the one bridge module (B) has connection terminals which are accessible from the outside, for a separate system bus line which can be connected to another system module ($S_i$) of the monitoring and control system.

6. Control device according to claim 1, characterized in that the bridge module (B) has connection terminals which are accessible from the outside, for a voltage supply line to an output of a regulated switched mode power supply of a system module ($S_i$), and the connection terminals are connected directly to the voltage supply terminal for the system modules ($S_i$) adjoining the bridge module (B).

7. Control device according to claim 5, characterized in that the connection terminals for the system bus are provided for connection to connection terminals which are accessible from the outside, of a field bus coupling module ($S_1$).

8. Control device according to claim 5, characterized in that a bridge module (B) has both connection terminals for the redundant system bus and a regulated switched mode power supply which is connected to the connection terminals for a supply voltage, for providing a redundant supply voltage.

9. Control device according to claim 5, characterized in that the system modules ($S_i$) and the at least one bridge module (B) are arranged on a common top-hat rail.

10. Control device according to claim 5, characterized in that the bridge module (B) is designed for providing a redundant voltage supply and a system bus for system modules ($S_i$) which are coupled to the bridge module (B) if the coupled system modules ($S_i$) are either no longer supplied with a supply voltage in another way or are no longer connected to a system bus in another way.

* * * * *